US007019243B2

(12) United States Patent
Tsuda et al.

(10) Patent No.: US 7,019,243 B2
(45) Date of Patent: Mar. 28, 2006

(54) LEVER SWITCH

(75) Inventors: Tatsuya Tsuda, Fukui (JP); Eiji Kodo, Fukui (JP); Yoshiharu Abe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 156 days.

(21) Appl. No.: 10/765,164

(22) Filed: Jan. 28, 2004

(65) Prior Publication Data

US 2004/0223416 A1    Nov. 11, 2004

(30) Foreign Application Priority Data

Jan. 29, 2003 (JP) .............................. 2003-020005

(51) Int. Cl.
*H01H 21/24* (2006.01)
(52) U.S. Cl. ...................... 200/559; 200/553; 200/557; 200/561; 200/563
(58) Field of Classification Search .... 200/16 R–16 D, 200/553, 557–559, 561–563, 339, 276.1, 200/61.82, 534, 537
See application file for complete search history.

(56) References Cited

U.S. PATENT DOCUMENTS

| 5,796,058 | A  | * | 8/1998  | Aimi et al. ................ 200/16 D |
| 6,479,776 | B1 | * | 11/2002 | Nakase et al. ............... 200/559 |
| 6,525,285 | B1 | * | 2/2003  | Kudo et al. .................. 200/559 |
| 6,559,401 | B1 | * | 5/2003  | Minami et al. .............. 200/559 |
| 6,633,013 | B1 | * | 10/2003 | Nishimura et al. ......... 200/559 |
| 6,917,008 | B1 | * | 7/2005  | Ni ............................... 200/563 |

FOREIGN PATENT DOCUMENTS

JP          04-27540         3/1992

* cited by examiner

*Primary Examiner*—Michael A. Friedhofer
(74) *Attorney, Agent, or Firm*—Wenderoth, Lind & Ponack, L.L.P.

(57) ABSTRACT

A lever switch includes a common contact and a fixed contact both prepared on at least an inner bottom face, or any one of inner faces of walls surrounding the inner bottom face, and a movable contact which touches or leaves at least one of the common contact or the fixed contact when a lever rotates. Terminal sections of the common contact and the fixed contact extend through walls of the housing. This structure allows the lever switch to fix those terminal sections to a wired board, thereby preventing the lever switch from coming off from the wired board. As a result, the lever switch can work with reliability.

6 Claims, 6 Drawing Sheets

LEVER SWITCH

FIELD OF THE INVENTION

The present invention relates to lever switches that are used for detecting the presence or absence of a recording medium or detecting an action of a mechanism in various electronic apparatuses.

BACKGROUND OF THE INVENTION

Recently, a variety of electronic apparatuses, such as videocassette recorders and personal computers, have been downsized and sophisticated. This trend requires lever switches used for detection to be more compact and slimmer as well as to work with reliability. The lever switches detect the presence or absence of recording media such as a tape or a disc, or detect an action of a mechanism in the apparatus. One of the conventional lever switches of this kind is disclosed in Japanese Utility Model Application Publication No. H04-27540.

This kind of conventional lever switch is described hereinafter with reference to FIG. 6 through FIG. 9. FIG. 6 shows a sectional view illustrating a structure of the conventional lever switch, and FIG. 7 shows a perspective view of the lever switch shown in FIG. 6. FIG. 8 shows a sectional view illustrating a structure when the lever switch shown in FIG. 6 is in operation, and FIG. 9 shows a schematic diagram illustrating that force is applied to the lever switch from behind, as shown in FIG. 6.

In FIG. 6, box-shaped housing 51 made of insulating resin has opening 511. Shaft 521 located at a middle section of lever 52 is rotatably held by housing 51. Driving section 522 on the lower face of lever 52 is accommodated in housing 51, while operating section 523 of lever 52 projects in a slanting position from opening 511 in an upward and leftward direction.

Common contact 53 and fixed contact 54 are both made from metal thin-plate, and they are disposed on the inner face of wall 560 (the lower wall in FIG. 6) opposite to opening 511. Both the contacts are bent over the edge wall 560 and extend outside housing 51. Common contact 53 having terminal section 531 and fixed contact 54 having terminal section 541 are thus formed.

Movable contact 55 is made from elastic metal thin-plate. A tip of first arm 552 extending from U-shaped bowing section 551 is urged elastically against common contact 53, while an intermediate section of second arm 553 extending from bowing section 551 is urged elastically against driving section 522 on the lower face of lever 52. A given clearance is provided between fixed contact 54 and contact 554 provided at the tip of second arm 553.

Lever 52 is held such that it can rotate on shaft 521 as a fulcrum in parallel with inner bottom face (rear inner face in FIG. 6) 570 of housing 51. Housing 51 thus accommodates common contact 53, fixed contact 54, movable contact 55 and parts of lever 52. The upper face (front face in FIG. 6) of housing 51 is covered by cover 580 shown in FIG. 7.

As shown in FIG. 7, the conventional lever switch discussed above is placed on wired-board 57 having plural wiring patterns (not shown), and terminal sections 531, 541 are soldered to a given wiring pattern. The lever switch is thus coupled to an electric circuit of an electric apparatus.

In the foregoing structure, operating section 523 of the lever is rotated by given force along direction A or B shown in FIG. 7. The lever can be directly rotated with operating section 523, or by using some pressing unit (not shown) on operating section 523 to work operating-section 523 within a given movable area. FIG. 8 shows the lever switch thus rotated.

In FIG. 8, since lever 52 rotates downward in the drawing on shaft 521 as a fulcrum, driving section 522 on the lower face of lever 52 urges movable contact 55 to bow, so that contact 554 at the tip of second arm 553 is brought into contact with fixed contact 54. Fixed contact 54 thus electrically contacts with common contact 53 via movable contact 55.

Release of the force applied to operating section 523 of the lever produces elastic restoring force of movable contact 55, so that driving section 522 is urged upward in the drawing, and lever 52 rotates upward. As a result, contact 554 leaves fixed contact 54 and returns to the status shown in FIG. 6.

However, the foregoing conventional lever switch has the following problem. Terminal section 531 of common contact 53 and terminal section 541 of fixed contact 54, both disposed on the inner face of wall 560, extend outside housing 51. Those terminal sections are soldered to wired-board 57 at only around wall 560 of housing 51. This structure thus invites the following inconveniences when extreme force F is applied to behind lever 52 as shown in FIG. 9, or extreme force F is applied to housing 51 from either side as shown in FIG. 7. The lever switch comes off from wired-board 57, or terminal sections 531 and 541 are deformed, so that operating section 523 of the lever moves outside the given movable area of the pressing unit (not shown) discussed previously. As a result, the lever switch sometimes does not work, or the operating force can be changed.

SUMMARY OF THE INVENTION

A lever switch of the present invention comprises the following elements:
(a) a housing including a first wall having an opening, a second wall opposite to the first wall, a third wall and a fourth wall both adjacent to the second wall, and an inner bottom face surrounded by the first through fourth walls;
(b) a lever rotatably held by the housing, including a driving section accommodated in the housing and an operating section extending outside the housing from the opening;
(c) a common contact disposed at least at one of the inner bottom face, or an inner face of the first, second, third, or fourth wall;
(d) a fixed contact disposed at least at one of the inner bottom face, or the inner face of the first, second, third, or fourth wall; and
(e) a movable contact for touching or leaving at least one of the common contact or the fixed contact depending on being urged by the driving section when the lever rotates.

At least one of a terminal section of the common contact and a terminal section of the fixed contact extends through at least one of the first wall through the fourth wall.

The foregoing structure allows the switch to be mounted to a wired board by fixing the terminal sections, which extend through housing walls, to the board. This structure prevents the switch from coming off from the board if some force is applied to the lever or the housing, so that the lever switch with a reliable operation is obtainable.

DETAILED DESCRIPTION OF THE INVENTION

Figure 1:
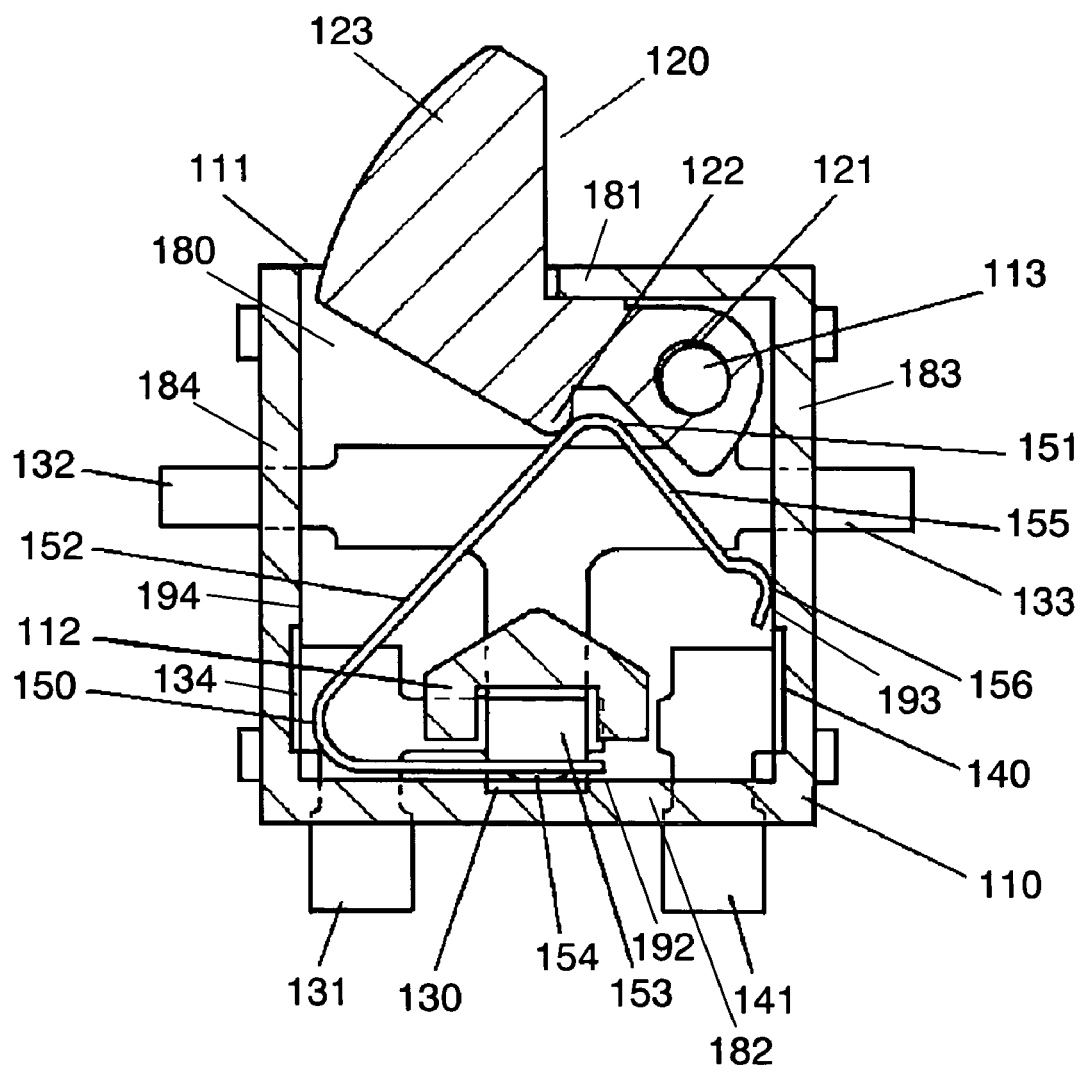
FIG. 1 shows a sectional view illustrating a structure of a lever switch in accordance with an exemplary embodiment of the present invention.
Figure 2:
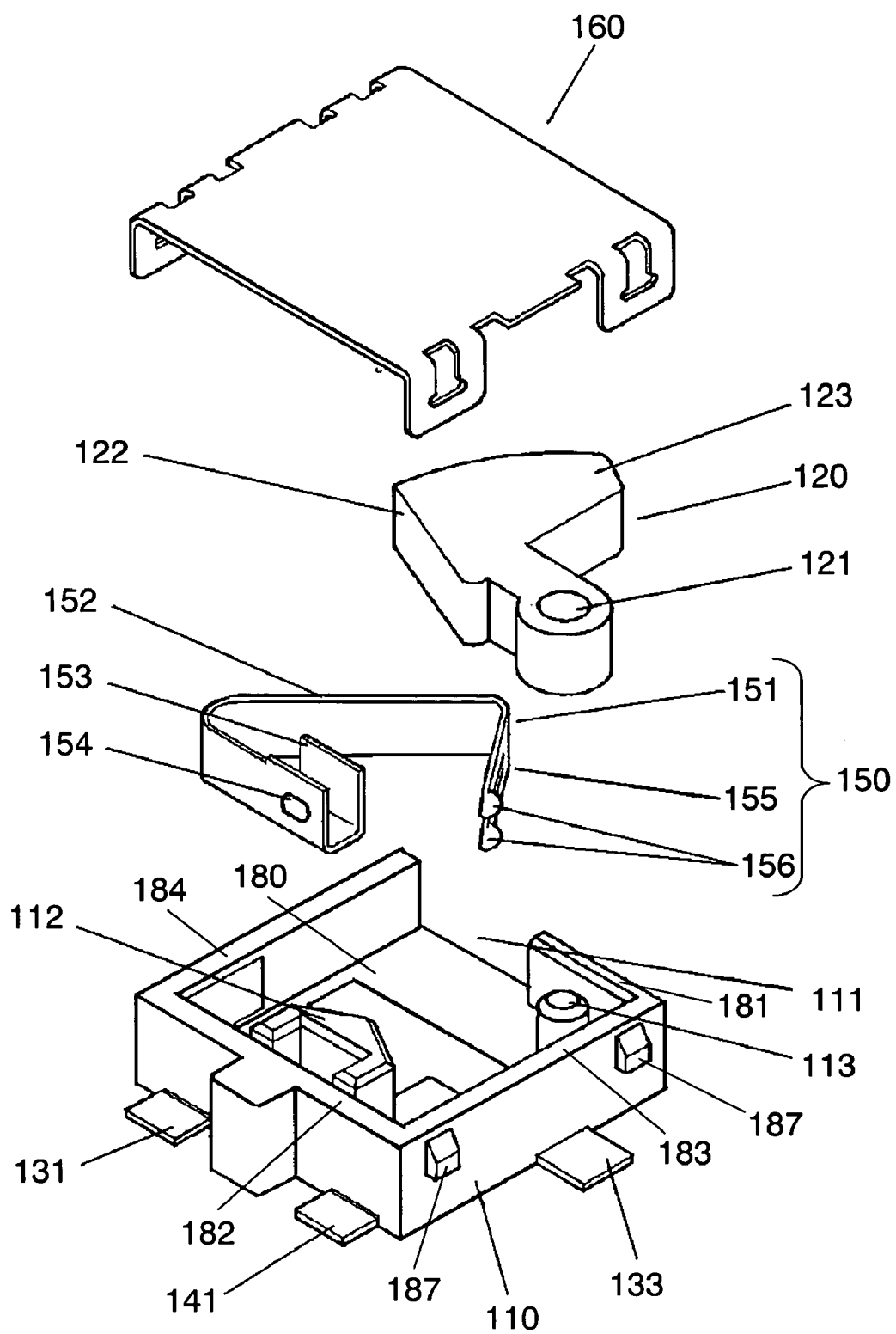
FIG. 2 shows a perspective exploded view of the lever switch shown in FIG. 1.
Figure 3:
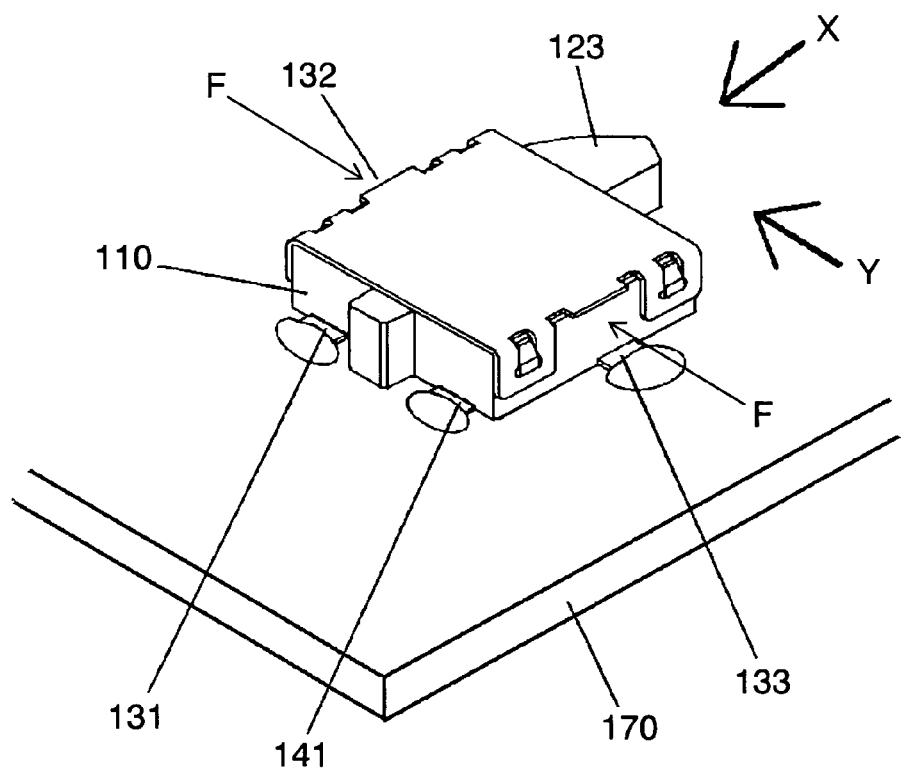
FIG. 3 shows a perspective view of the lever switch shown in FIG. 1.
Figure 4:
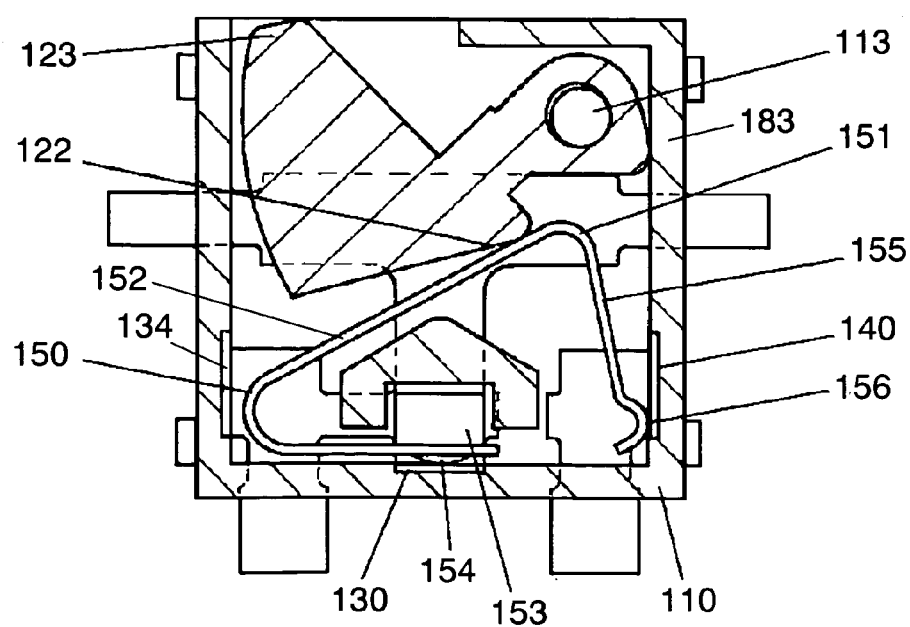
FIG. 4 shows a sectional view illustrating a structure of the lever switch shown in FIG. 1 in operation.

FIG. 1 shows a sectional view illustrating a structure of a lever switch in accordance with an exemplary embodiment of the present invention. FIG. 2 shows a perspective exploded view of the lever switch shown in FIG. 1. FIG. 3 shows a perspective view of the lever switch shown in FIG. 1. FIG. 4 shows a sectional view illustrating a structure of the lever switch shown in FIG. 1 in operation.

In FIG. 1, box-shaped housing 110 made of insulating resin includes first wall 181 having opening 111, second wall 182 opposite to the first wall 181, third wall 183 and fourth wall 184 both adjacent to the second wall 182, and bottom face 180 surrounded by the first through fourth walls.

Driving section 122 on the lower face of lever 120 made of insulating resin is accommodated in housing 110, and operating section 123 of lever 120 extends upward from opening 111 of housing 110.

Common contacts 130, 134 and fixed contact 140 are made from conductive metal thin-plate. Parts of the metal thin-plate forming the common contact is shaped like the letter T, and disposed on inner bottom face 180. An end of common contact 130 is bent and disposed on inner face 192 of second wall 182. An end of common contact 134 is bent and disposed on inner face 194 of fourth wall 184. An end of fixed contact 140 is bend and disposed on inner face 193 of third wall 183. Those contacts disposed on the inner faces are prepared by insert-molding the metal thin-plate when the resin is molded.

Terminal section 131 of the common contact 134 extends through second wall 182, and terminal section 133 of the common contact 130 extends through third wall 183. Terminal section 132 of the common contact 130 extends through fourth wall 184. Terminal section 141 of the fixed contact 140 extends through second wall 182.

Further in FIG. 1, supporting projection 112 stands on inner bottom face 180 at a lower middle section with a given clearance from common contact 130. At an upper right section of inner face 180 in FIG. 1, cylindrical supporting shaft 113 stands. Shaft-hole 121 formed at an end of lever 120 is inserted onto shaft 113, so that lever 120 is held rotatably with respect to housing 110.

Movable contact 150 is made from elastic metal thin-plate, and its width is smaller than the depth of housing 110. Movable contact 150 includes bent section 151, first arm 152 extending from bent section 151 along a first direction, and second arm 155 extending from bent section 151 along a second direction. First arm 152 is shaped like the letter V, and has fixing section 153 bent like the letter U at its end as shown in FIG. 2. First arm 152 is somewhat bowed, and fixing section 153 is inserted and held between projection 112 and common contact 130. Fixing section 153 has arc-shaped projection 154 on its face opposite to common contact 130, and projection 154 is urged elastically against common contact 130. Meanwhile first arm 152 can be shaped like the letter L instead of the letter V.

As shown in FIG. 2, second arm 155 of movable contact 150 has plural arc-shaped contacts 156 on its tip, and a notch between the contacts 156. Those contacts 156 urge elastically against the inner face of third wall 183 at above the position where fixed contact 140 is placed, namely, an upper place in FIG. 1.

Driving section 122 on the lower face of lever 120 is urged elastically against movable contact 150 around bent section 151 of movable contact 150. The upper face of lever 120 of operating section 123 (right-hand side of the upper face in the drawing) is urged elastically against the inner face of first wall 181. Lever 120 is held such that it can rotate on supporting shaft 113 as a fulcrum in parallel with inner bottom face 180.

As shown in FIG. 1, the top (the front in FIG. 1) of housing 110, which accommodates common contact 130, fixed contact 140 and movable contact 150, does not have a wall and is open, and the top is covered by cover 160 shown in FIG. 2. The lever switch of the present invention is thus formed.

When the lever switch of the present invention is mounted to an apparatus, the lever switch is placed on wired board 170 where plural wiring patterns (not shown) are formed. At this time, terminal section 141 of the fixed contact and terminal section 131 of the common contact extend through second wall 182. Further, terminal section 133 of the common contact extends through third wall 183, terminal section 132 extends through fourth wall 184. Those four terminal sections are respectively coupled to given wiring patterns, so that the lever switch is electrically coupled to electronic circuits of the apparatus.

An operation of the lever switch in accordance with this exemplary embodiment is demonstrated hereinafter. In FIG. 3, when operating section 123 of the lever is rotated by given force in the X or Y direction, lever 120 rotates on supporting shaft 113 downward in FIG. 4. This rotation entails driving section 122 of the lever to press against the vicinity of bent section 151 of the movable contact. Then movable contact 150 bows, and plural contacts 156 at the tip of second arm 155 elastically slide downward on the inner face of third wall 183 until they touch fixed contact 140. Projection 154 on fixing section 153 of the movable contact is thus urged elastically against common contact 130, and contacts 156 of the movable contact 150 is thus urged elastically against fixed contact 140. As a result, common contact 130 is electrically coupled to fixed contact 140 via movable contact 150.

Figure 9:
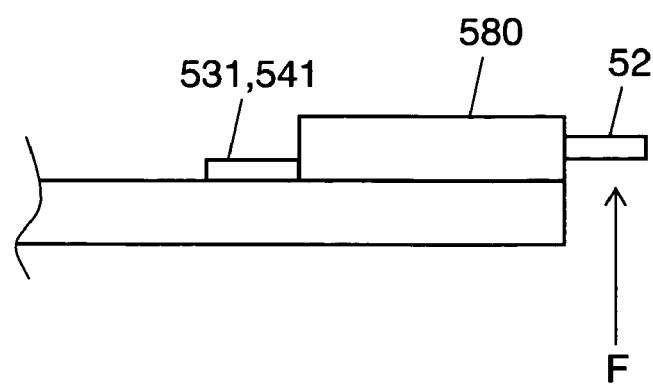
FIG. 9 shows a schematic view illustrating a force applied to behind the lever switch shown in FIG. 6.

In FIG. 1 and FIG. 4, even if extreme force F is applied to lever 120 in a direction, such as along the arrow mark shown in FIG. 9, or even if extreme force F is applied to housing 110 from either side as shown in FIG. 3, the lever switch is rigidly mounted to wired board 170 by soldering at the following four points: two points, i.e. terminal sections 131, 141 at the lower section in FIG. 1, and two points, i.e. terminal sections 132, 133 on both the sides in FIG. 1. This structure prevents the lever switch from coming off from wired board 170, and assures that the lever switch will work with reliability.

If extreme force F greater than a given value is applied to lever 120, cover 160 is detached from tab 187, and lever 120 is removed from shaft 113, so that the switch cannot stay in an on-status any longer. In other words, the lever switch can be constructed according to the safety breach principle.

On the other hand, when operating force is released from operating section 123 of the lever 120, driving section 122 is urged upward in FIG. 4 by the elastic restoring force of movable contact 150, so that lever 120 rotates. This causes contacts 156 of the movable contact 150 to elastically slide upward on wall 183 and leave fixed contact 140, then return to the status shown in FIG. 1.

As discussed above, according to the structure of this embodiment, common contact 130 and fixed contact 140 are disposed on inner bottom face 180 or on the inner faces of plural walls of the housing, and terminal sections 131, 132, 133, and 141 of those contacts extend through the plural walls. This structure allows soldering of those plural terminal sections rigidly to wired board 170, so that the lever switch can be prevented from coming off from board 170 if an extreme force is applied to lever 120 or housing 110. As a result, a lever switch working with reliability is obtainable. Meanwhile, the invention is not limited to soldering for fixing the terminal sections to the wired board, but laser welding or caulking can be used instead.

Common contact 130 is prepared on the inner face of second wall 182, and fixed contact 140 is prepared on the inner face of third wall 183 abutting second wall 182. First arm 152 of movable contact 150 is formed of elastic metal thin-plate shaped like the letter V When lever 120 rotates, contacts 156 at the tip of second arm 155 slide until they touch fixed contact 140. This structure allows a given contact pressure to be produced when movable contact 150 is brought into contact with fixed contact 140, so that the contacts can stay in contact with each other in a stable manner and the switch works with reliability.

Projection 154 is prepared at fixing section 153 on the tip of first arm 152, and projection 154 urges elastically against common contact 130. This structure allows movable contact 150 to stay in contact with common contact 130 in a stable manner.

Further, a notch is provided to second arm 155 of the movable contact for forming plural contacts 156. A lever operation brings plural contacts 156 in contact with fixed contact 140, so that if a first contact of contacts 156 fails in contacting with fixed contact 140 due to, e.g. dust attached to the first contact, a second contact can be brought into contact with fixed contact 140 instead. As a result, reliable contact between movable contact 150 and fixed contact 140 can be expected.

Shaft hole 121 is provided at an end of lever 120, and shaft 113 of the housing is inserted into hole 121, so that lever 120 is held rotatably. This structure allows lever 120 to rotate on the end as a fulcrum instead of at the middle of the lever, so that lever 120 can rotate with a longer radius.

The foregoing discussion is directed to a push-on switch, i.e. wherein lever rotation causes contact of contacts 156 of movable contact 150 with fixed contact 140. Alternatively to that structure, fixed contact 140 can be prepared on the inner face of third wall 183 at an upper position, and a lever rotation removes movable contact from fixed contact 140. In other words, the present invention is also applicable to a push-off switch.

The foregoing description refers to the structure where terminal sections 131, 132, 133 extend through second wall 182, fourth wall 184 and third wall 183 of the housing respectively, and terminal section 141 of fixed contact 140 extends through second wall 182. However, arrangements other than the foregoing structure are contemplated. That is, terminal sections can extend through any of the walls of the housing, thereby producing a similar advantage, e.g. terminal section 141 of fixed contact can extend through third wall 183.

This embodiment refers to the structure where plural terminal sections of the common contact and one terminal section of the fixed contact extend through plural walls of the housing. However, a structure, in which one terminal section of the common contact and plural terminal sections of the fixed contacts extend through plural walls, can produce a similar advantage to what is discussed above. Further, a structure where plural terminal sections of the common contact and plural terminal sections of the fixed contact extend through plural walls also can produce a similar advantage.

The previous description refers to the structure where terminal sections of the common contact or the fixed contact extend through either one of the second or fourth wall; however, they can extend through the first wall having the opening.

Figure 5:
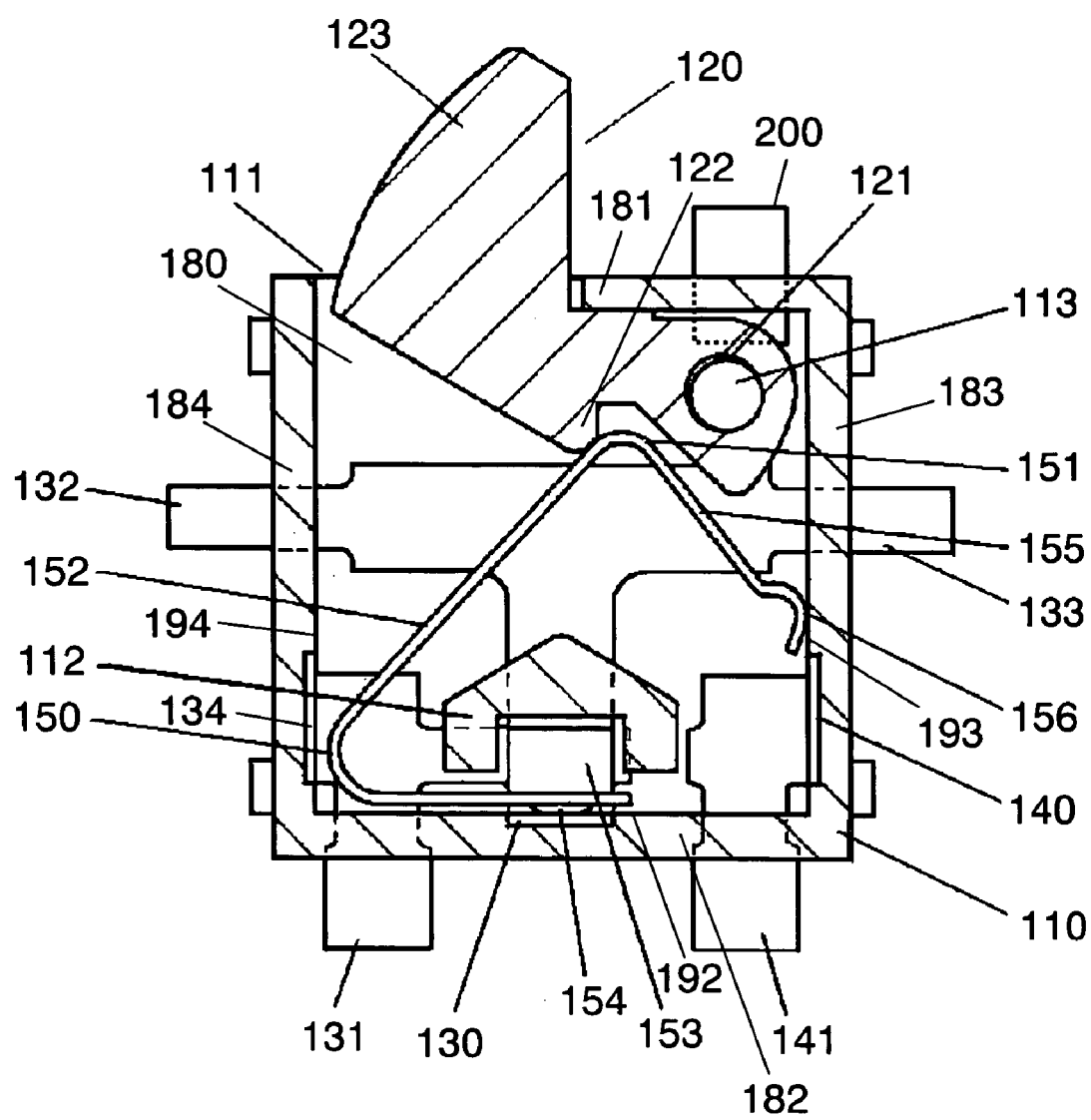
FIG. 5 shows a sectional view of a lever switch, in accordance with an exemplary embodiment, having a fixed terminal section.
Figure 6:
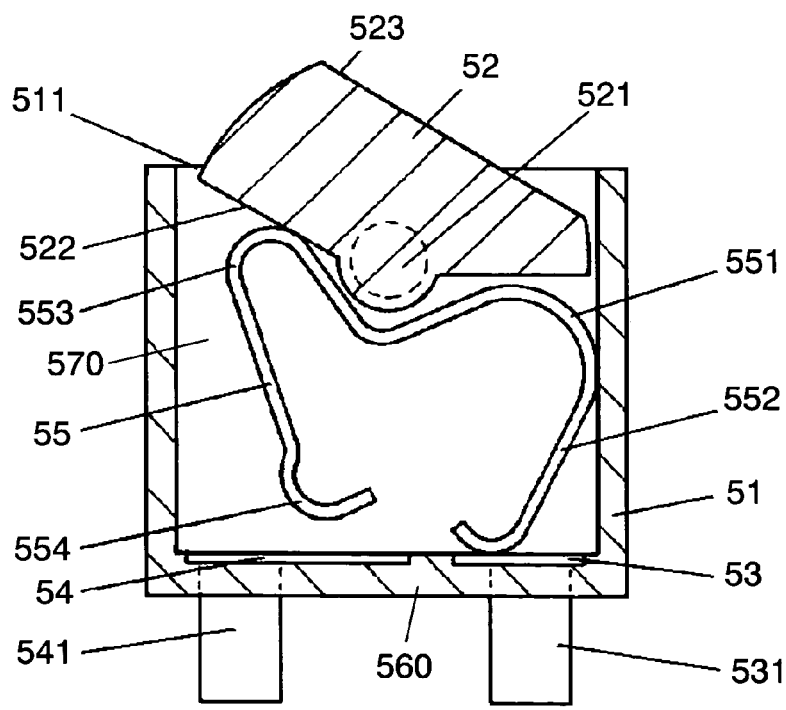
FIG. 6 shows a sectional view illustrating a structure of a conventional lever switch.
Figure 7:
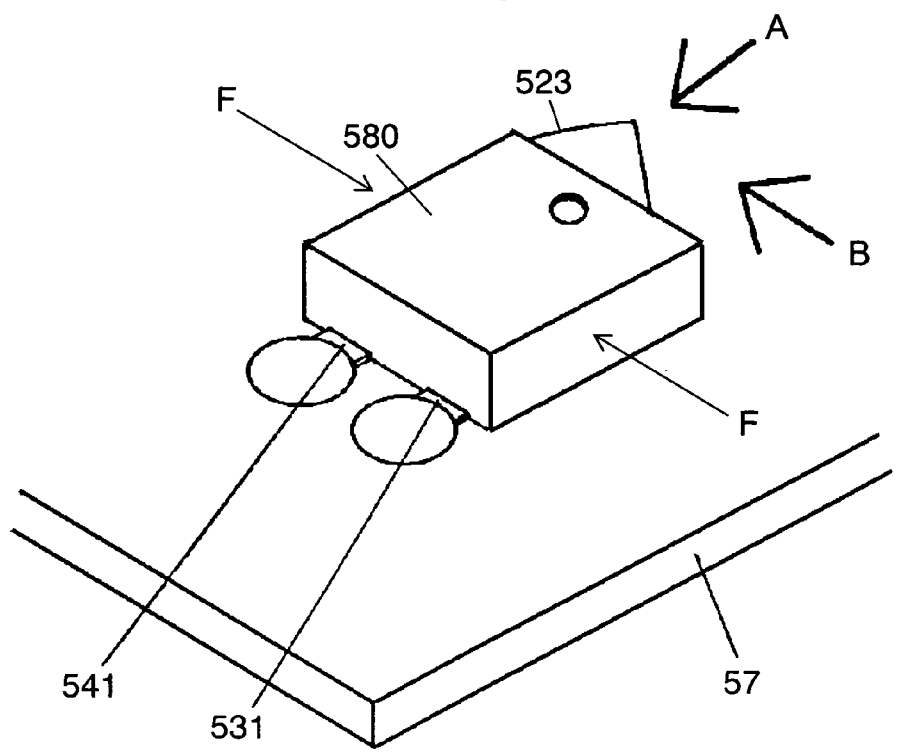
FIG. 7 shows a perspective view of the lever switch shown in FIG. 6.
Figure 8:
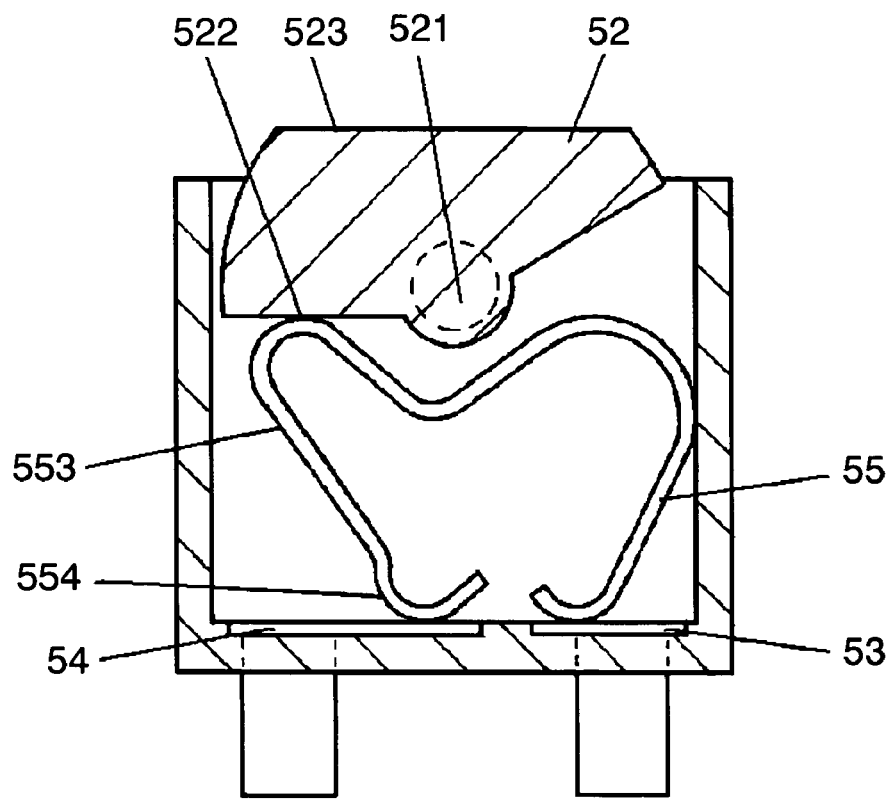
FIG. 8 shows a sectional view illustrating a structure of the lever switch shown in FIG. 6 in operation.

A fixed terminal section extending through at least one of the first wall through the fourth wall can be prepared independently of the terminal sections of the common contact and the fixed contact. FIG. 5 illustrates this case. In the embodiment shown in FIG. 5, fixed terminal section 200 extends through first wall 181 having opening 111. Other elements other than fixed terminal section 200 remain the same as shown in FIG. 1. This embodiment proves that not only the terminal sections of the common contact and the fixed contact but also fixed terminal section 200 can be fixed to the wired board. Not to mention, plural fixed terminal sections 200 can be prepared. The terminal sections of the common contact and/or the fixed contact can extend through the first wall.

What is claimed is:

1. A lever switch comprising:
a housing including a first wall having an opening, a second wall opposite to the first wall, a third wall and a fourth wall both adjacent to the second wall, and an inner bottom face surrounded by the first through fourth walls;
a lever, rotatably held by the housing, including a driving section accommodated in the housing and an operating section extending outside the housing from the opening;
a common contact disposed at least at one of the inner bottom face, or an inner face of the first, second, third, or fourth wall, said common contact having a terminal section;
a fixed contact disposed at least at one of the inner bottom face, or the inner face of the first, second, third, or fourth wall, said fixed contact having a terminal section;
a movable contact for touching or leaving at least one of the common contact or the fixed contact depending on being urged by the driving section when the lever rotates; and a fixed terminal section, which is prepared independently of the terminal sections of the common contact and the fixed contact, extending through at least one of the first through the fourth wall;

wherein at least one of the terminal section of the common contact and the terminal section of the fixed contact extends through at least one of the first wall through the fourth wall.

2. The lever switch of claim 1, wherein an end of the lever is held by the housing.

3. The lever switch of claim 1, wherein the movable contact is formed of elastic metal thin-plate and includes a bent section, first arm extending from the bent section and a second arm extending from the bent section said first arm having a fixing section at a tip thereof and being urged elastically against the common contact; and wherein the driving section of the lever is arranged to press against a vicinity of the bent section, so that a contact at a tip of the second arm touches or leaves the fixed contact.

4. The lever switch of claim 3 further comprising a projection on the fixing section at the tip of the first arm.

5. The lever switch of claim 3, wherein the second arm is provided with a notch to form a plurality of contacts at the tip of the second arm.

6. The lever switch of claim 3, wherein the first arm of the movable contact is V-shaped or L-shaped.

* * * * *